March 19, 1963

R. DIENER 3,082,352

CIRCUIT FOR CONTROLLING THE STRIKING PHASE OF ONE OR MORE
GAS-FILLED TRIODES CONNECTED TO AN A.C. VOLTAGE

Filed Jan. 4, 1961

INVENTOR.
RUDOLF DIENER

By Richardson, David and Virdon

ATTY'S

United States Patent Office 3,082,352
Patented Mar. 19, 1963

3,082,352
CIRCUIT FOR CONTROLLING THE STRIKING PHASE OF ONE OR MORE GAS-FILLED TRIODES CONNECTED TO AN A.C. VOLTAGE
Rudolf Diener, Zurich, Switzerland, assignor to Elemag-Anstalt, Vaduz, Liechtenstein
Filed Jan. 4, 1961, Ser. No. 80,626
4 Claims. (Cl. 315—163)

To control the striking phase of gas-filled triodes, use is generally made of a phase-shift bridge and a pulse transformer which feeds a striking pulse to the grid of the gas-filled triode when a certain phase shift is reached. The disadvantage of these circuits is that the striking phase can be controlled only within a range of about 150° if circuit cost is to be kept fairly low. Even with this limitation of the range of control, however, circuits of this kind are relatively expensive, particularly owing to the pulse transformer, and in addition they consume a considerable power. The object of the invention is to obviate these disadvantages by a relatively simple, inexpensive circuit.

The circuit according to the invention comprises one or more main gas-filled triodes whose striking phase is to be controlled and normally held non-conductive by negative grid bias thereon. The circuit also includes an auxiliary gas-filled triode, the grid circuit of which has means for setting a negative grid bias voltage thereon; a condenser charged through a resistor by trapezoidal voltage half-waves derived from an alternating voltage through a rectifier until the condenser voltage balances out the negative grid bias voltage on the auxiliary gas-filled trode and this triode strikes; and a second resistor which is common to the anode circuit of the auxiliary gas-filled triode and to the grid circuit of each main gas-filled triode, so that on the striking of the auxiliary gas-filled triode a voltage drop across the second resistor balances out negative bias on the grid of each other main gas-filled triode causing it to strike when its anode is positive with respect to its cathode.

An embodiment of the invention will be described by way of example with the aid of the accompanying drawings wherein.

Figure 1:
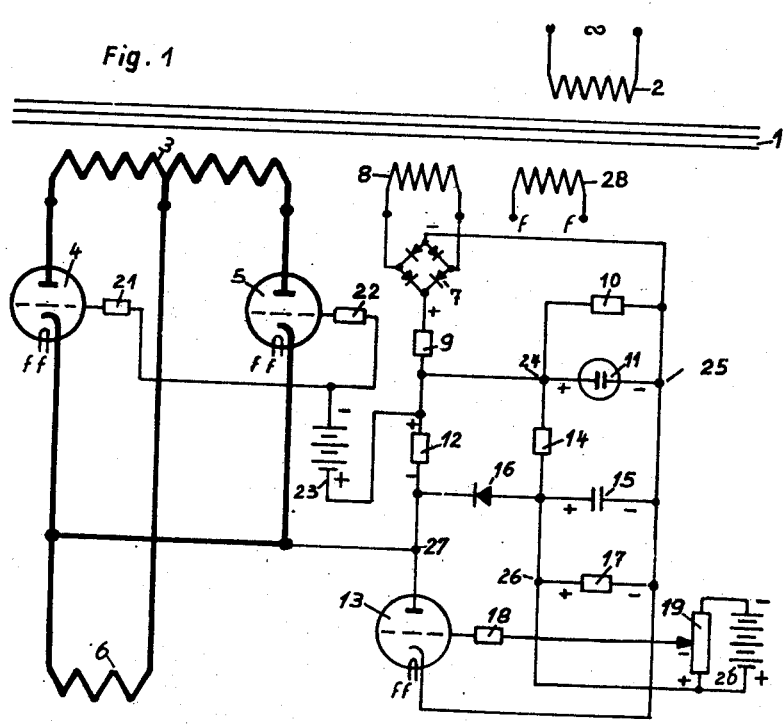
FIGURE 1 shows an example of circuit according to the invention.

The primary winding 2 of a transformer 1 is connected to the A.C. mains. Two gas-filled thyratron triodes 4 and 5 and a load 6 are connected to a secondary winding 3 of this transformer in a full-wave rectification circuit. The striking phase of these gas-filled triodes 4 and 5 is to be controlled so as to vary the current drawn by the load 6. A rectifier bridge 7 is connected to another secondary winding 8 of the transformer 1. The output voltage of the bridge 7, which consists of rectified sinusoidal half-waves, is fed to two resistors 9 and 10 which are connected in series and form a voltage divider. A cold-cathode diode 11 serving as a voltage limiter is connected in parallel with the resistor 10. The series circuit comprising a resistor 12 and an auxiliary gas-filled triode 13, and the series circuit comprising a resistor 14 and a condenser 15 are in turn connected in parallel with the cold-cathode diode 11. The terminals of the resistors 12 and 14 remote from the cold-cathode diode 11 are connected together by a rectifier 16, while a resistor 17 is connected in parallel with the condenser 15.

The grid of the gas-filled triode 13 is connected by a protective resistor 18 to the movable tap of a potentiometer 19 fed by a D.C. voltage source 20. The positive pole of the voltage source 20 is connected by the resistor 17 to the cathode of the auxiliary gas-filled triode 13.

The two grids of the gas-filled triodes 4 and 5 are connected by protective resistors 21 and 22 to the negative pole of a D.C. voltage source 23, the positive pole of which is connected to the junction point 24 of the cold cathode diode 11 and the resistors 9, 10, 12, 14. The junction point of the cold cathode diode 11 and the resistors 10 and 17, the condenser 15, and the cathode of the gas-filled triode 13 is denoted by reference 25, while the junction point of the potentiometer 19, the voltage source 20 with the resistors 17 and 14, the condenser 15 and the rectifier 16 is denoted by reference 26. The anode of the gas-filled triode 13 is connected at the point 27 to the resistor 12, rectifier 16 and the cathodes of the gas-filled triodes 4 and 5.

A third secondary winding 28 of the transformer 1 delivers the heater current for the cathodes of the gas-filled triodes 4, 5 and 13, as indicated by the terminal references *ff* in the usual way.

The circuit described operates as follows: if no voltage drop occurs at the resistor 12 to counteract the negative bias of the grids of the gas-filled triodes 4 and 5 as supplied by the voltage source 23, then these gas-filled triodes are cut off and the load 6 receives no current whatever. A current can flow through the resistor 12 in the circuit 24, 12, 13, 25 if the auxiliary gas-filled triode 13 is conductive; the period of time during which this is the case depends, as will be explained in detail hereinafter, on the setting of the tap of the potentiometer 19, so that the striking phase of the gas-filled triodes 4 and 5 and hence the current drawn by the load can ultimately be controlled by the adjustment of said tap.

Figure 2:
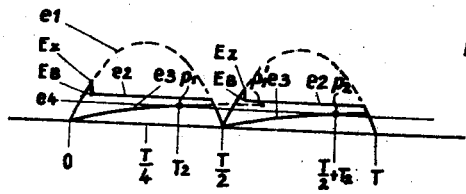
FIGURE 2 is an explanatory diagram.

The voltage occurring at the output of the rectifier bridge 7 during a full A.C. cycle T has the form of two rectified sinusoidal half-waves, which are regarded as positive. In the absence of the cold-cathode diode 11, two positive sinusoidal half-waves $e1$ shown in broken lines in FIGURE 2 would also occur at the resistor 10 of the voltage divider 9, 10, that is to say between the points 24 and 25. Since the cold-cathode diode 11 conducts when its striking voltage $Ez$ is reached, it limits the voltage $e2$ between the points 24 and 25 to the somewhat lower normal-running voltage $EB$, so that this voltage $e2$, which is shown in solid lines in FIGURE 2, has substantially the shape of low trapezoids. The condenser 15, which is fully discharged at the beginning of each half-wave, charges up through the resistor 14, the time constant $RC$ of the charging circuit 14, 15 being relatively high, so that the voltage at the condenser or at the resistor 17 parallel therewith rises relatively slowly, or is still substantially linear within a half-cycle and if the voltage $e2$ were maintained, the voltage $e3$ would asymptotically only approach voltage $e2$ some time later. In the grid circuit of the auxiliary gas-filled triode 13, the voltage occurring at the condenser 15 and at the resistor 17 parallel thereto is directed in opposition to the voltage tapped off from the potentiometer 19. In FIGURE 2, the positive value of the voltage tapped off from the potentiometer 19 is denoted by the reference $e4$. As long as $e4$ is larger than $e3$ the grid of the auxiliary gas-filled triode 13 has negative bias and thus this auxiliary gas-filled triode 13 is cut off. When $e3$ becomes equal (or substantially equal) to $e4$, as occurs in the first half-cycle at the point P1 at the time T2, the auxiliary gas-filled triode 13 strikes and conducts and the condenser 15 discharges through the rectifier 16 and the auxiliary gas-filled triode 13. Once the auxiliary gas-filled triode 13 has struck, it continues to conduct, so that as from the moment T2 a current flows, as a result of the voltage $e2$, from the point 24 through the resistor 12 and the auxiliary gas-filled triode 13 to the point 25. In the grid circuit of the gas-filled triodes 4 and 5, the voltage drop at the resistor 12 is directed in opposition to the negative bias supplied by the source 23 and is equal (or substantially equal) in magnitude to this bias, so that the gas-filled triode whose anode is positive with respect to the cathode, for example the gas-filled triode 4, strikes and continues to conduct from the striking time T2 until the time $$\frac{T}{2}$$

at which the first half-cycle ends. At the end of the first half-cycle the gas-filled triodes 3 and 4 are extinguished, because the relevant anode voltages become zero.

The process described is repeated in the second half-cycle, striking of the gas-filled triode 3 occurring at the point P2 at the time $$\frac{T}{2}+T2$$

This time the gas-filled triode 5 strikes and continues to conduct until the time T.

If the cold-cathode diode 11 acting as a voltage limiter were not provided, the condenser 15 would not be charged up by a constant voltage during substantially one half-cycle. The condenser voltage would not rise substantially linearly but would rise initially with a much steeper slope, while between $$\frac{T}{4}$$

and $$\frac{T}{2}$$

it would rise only very slowly, so that the lines e3 and e4 would not furnish any sharp points of intersection or any points of intersection P1, P2 at all near $$\frac{T}{2}$$

or T.

With the present circuit the striking phase can be controlled practically within a range of 180°. It may even be controlled beyond 180°. In fact, if the potentiometer voltage e4 is so selected that e3 and e4 do not intersect in the first half-cycle, then the condenser 15 does not discharge at the end of this half-cycle but continues to charge up in the second half-cycle, as shown in broken lines. The resistor 17 has a very high resistance so that the current through the resistor 17 in the short transition period during which the voltage is smaller than EB, is negligible. The first striking point P1 is then in the second half-cycle, the next striking point in the fourth half-cycle, and so on. In the present connection, namely for the control of the current supplied to the load 6 by the gas-filled triodes 4 and 5, striking at the point P1 in the second half-cycle, in which case only the gas-filled triode 5 would operate, is pointless, but cases are possible in which a phase shift of the striking time in a range of more than 180° may be advantageous. In the present case the potentiometer will be provided with a stop to prevent control beyond 180°.

The circuit described has the advantage of ensuring a large range of control and a very exact control at very small cost. The requisite tubes 11 and 13, and the various resistors, the condenser 15 and the rectifier 16 are in fact much cheaper than the transformers and phase shift bridges used in conventional circuits and they also consume a much lower power during operation. The potentiometer 19 may be calibrated in degrees corresponding to the striking commencement phase or, for example, in percentages of the maximum current that can be fed to the load 6.

What we claim is:

1. A circuit for controlling the striking of a main gas-filled triode having an anode and cathode connected to an alternating sinusoidal voltage in circuit with a load, said triode having a grid circuit normally biased negatively to cut-off the triode, comprising a gas-filled control triode having another anode, cathode and grid circuit, means for applying an adjustable negative bias to the grid of the control triode to cut-off the control triode, a direct current source and a first resistor connected in series with the anode and cathode of the control triode and also connected to the grid circuit of the main triode to apply the first named negative grid bias thereto, a condenser and a second resistor connected in another series circuit so that said other series circuit has a predetermined time constant, means for applying a charging, cyclical direct, amplitude limited voltage to said condenser through said second resistor, means for deriving said direct voltage from said alternating sinusoidal voltage, means for limiting the charging voltage to a predetermined magnitude so that the charging voltage has a trapezoidal wave shape in each half cycle thereof, said other series circuit being connected to the grid biasing means of the control triode so that the negative bias on the grid of the control bias is overcome by the voltage of the charging condenser to strike the control triode and pass a current through its anode and cathode and through the first resistor, whereby passage of current through the first resistor upon striking of the control triode overcomes the negative bias on the grid of the main triode and the main triode strikes to pass a current to the load when the anode of the main triode is positive with respect to the cathode of the main triode.

2. A circuit according to claim 1, wherein the limiting means for the charging voltage includes a diode having a cold cathode, said means for deriving the direct voltage from the alternating sinusoidal voltage including a full wave rectifier bridge, said rectifier bridge having an input and output, said input being connected to the alternating voltage, and voltage divider resistors connected across the output of the rectifier bridge, said diode being connected in parallel with one of the voltage divider resistors.

3. A circuit according to claim 1, further comprising a rectifier connected between the anode of the control rectifier and the condenser, so that the condenser discharges through the control triode when the control triode strikes.

4. A circuit according to claim 2, wherein the means for applying adjustable negative bias to the grid of the control triode includes an adjustable potentiometer and source of direct voltage, so that the striking of the main triode can be controllably set to occur at any instant in each 360° cycle ranging from more than 0° to less than 360°.

References Cited in the file of this patent
UNITED STATES PATENTS 2,421,994    Cooper _____ June 10, 1947
2,617,977    Large _____ Nov. 11, 1952